United States Patent [19]

Lakhani et al.

[11] 4,443,292

[45] Apr. 17, 1984

[54] WEAR RESISTANT ELECTRODE HEAD FOR ELECTROGRAPHIC PRINTERS

[75] Inventors: Kishor M. Lakhani; Jerry L. Ligon, both of Oklahoma, Okla.

[73] Assignee: Honeywell Information Systems Inc., Waltham, Mass.

[21] Appl. No.: 474,923

[22] Filed: Mar. 14, 1983

Related U.S. Application Data

[62] Division of Ser. No. 259,889, May 4, 1981, Pat. No. 4,399,447.

[51] Int. Cl.³ .......................... C23F 1/02; B05D 1/02; G01D 15/06
[52] U.S. Cl. .................................. 156/634; 156/645; 156/656; 156/153; 156/278; 346/155; 427/427
[58] Field of Search ............... 156/629, 633, 634, 645, 156/656, 659.1, 153, 154, 278; 346/155, 156; 427/421, 427

[56] References Cited

U.S. PATENT DOCUMENTS 3,795,010  2/1974  Ring ................................. 346/155
4,356,501  10/1982  Rowen ............................. 346/155

*Primary Examiner*—William A. Powell
*Attorney, Agent, or Firm*—Nicholas Prasinos

[57] ABSTRACT

An electrographic printhead and a process for assembling same that results in decreased shorting between styli and increased resistance to wear from paper abrasion and further provides high resolution electrographic printing. Each electric circuit board forming the electrographic printhead comprises arrays of wires that are bonded between two stainless steel support bars utilizing an alumina treated face for insulation and molybdenum face for wear resistance.

7 Claims, 14 Drawing Figures

WEAR RESISTANT ELECTRODE HEAD FOR ELECTROGRAPHIC PRINTERS

This application is a division of application Ser. No. 259,889, filed May 4, 1981, now U.S. Pat. No. 4,399,447.

BACKGROUND OF THE INVENTION

1. Field of the Invention

This invention relates to electrographic printheads and more particularly to a method and apparatus having the capability of withstanding mechanical wear and dielectric build-up which resulted in poor print quality and/or shorts.

2. Description of the Prior Art

Printheads for electrographic printing are made from etched electrode circuit boards or arrays of wires that are bonded between two stainless steel support bars. The ends of the closely-spaced etched circuits or wires are exposed to create printing styli. Electrographing paper which is placed in contact with the surface of the printing head, contacts the exposed printing styli as it is dragged across the printhead. Digitally controlled printing voltages (0–500 volts D.C.) connected to the styli, electrically charge the surface of the electrographic paper to create a latent charge image. The latent charge image thus produced on the electrographic paper surface is then toned with electrostatically-charged pigment particles to produce a visible image. Typical prior art printheads are disclosed in U.S. Pat. Nos. 3,958,251 and 3,624,661.

Because the electrographic printhead is in close contact with the electrographic paper travelling at high speeds, several problems became evident. One problem arose when utilizing papers of various widths. When paper of narrow width was utilized, the wear on the electrode head created a stepped recess. When wider paper was utilized, the paper rested on the upper part of the step, whereas the inner part of the step was recessed. This created a gap between the electrode head and the paper thus preventing imaging. Another problem was the epoxy resin and substrate recession below the head bars. Still another problem was dielectric build-up on the styli and inter-stylus shorting, resulting in poor print quality.

In order to illustrate these problems, prior art FIGS. 1A, 1B, 2A, 2B and 3 are included.

Referring to FIGS. 1A and 1B the prior art printhead comprises a Teflon laminate substrate 1 having a plurality of copper styli 2 bonded thereon. This assembly is bonded to two stainless steel head bars 3 utilizing epoxy 4.

Referring now to FIGS. 2A and 2B, there is shown in cross section, a plan view and a side view (lengthwise) of a prior art electrographic printhead in contact with wide electrographic paper 5. The paper is flowing upward as indicated by the arrow 6. It can be seen that a recess (a) has worn into the electrode head from use of narrow paper 7 shown in dotted lines. The stepped recess (a) will prevent the imaging process.

Finally, referring to FIG. 3, a cross section of a prior art electrographic printhead is shown having styli 2 which have been sputtered to leave a recess 10.

What is required is an electrographic printhead having the following quality characteristics: (1) mechanical wear of the head bars should be minimized; (2) epoxy recession due to abrasive wear should be minimized; (3) electrical and mechanical erosion of styli should be improved; and (4) dielectric build-up on styli and inter-stylus shorting should be minimized.

OBJECTS OF THE INVENTION

It is a primary object of the invention to provide an improved electrographic printhead.

It is another object of the invention to provide an electrographic printhead which is highly resistant to mechanical wear.

It is still a further object of the invention to provide an electrographic printhead having improved electrical and mechanical erosion of styli.

It is still another object of the invention to provide an electrographic printhead having minimum dielectric build-up on the styli and reduced inter-stylus shorting.

SUMMARY OF THE INVENTION

In accordance with the above and other objects of the invention, there is provided a method and apparatus with improved wear resistance characteristics, epoxy recession, electrical and mechanical erosion and resistance to dielectric build-up and shorting. The crown 11 of the electrographic head is coated with molybdenum providing desirable thermal and electrical properties, as well as lubricity which reduces head bar wear. Moreover the insulating epoxy layers 4 of FIGS. 1–3 are replaced by a combination of an alumina or alumina-titania coating which is very hard and is an electrical insulator, and a short-resistant epoxy layer.

DESCRIPTION OF THE PREFERRED EMBODIMENT

Referring now to FIGS. 4A through 4E, the process of coating the steel head bars with molybdenum and alumina will now be described. There are essentially five steps required, shown in FIGS. 4A through 4E.

Figure 4A:
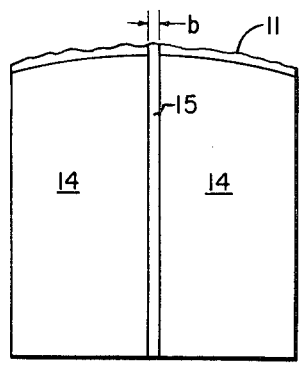
FIGS. 4A through 4E illustrate the process of coating molybdenum and alumina to appropriate faces of the steel head bar of the invention.
Figure 4B:
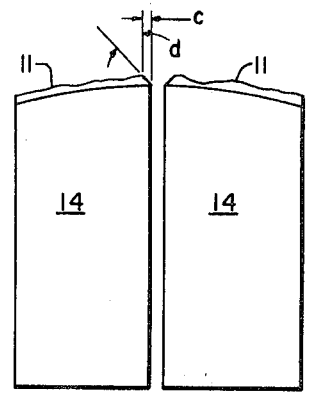
Figure 4C:
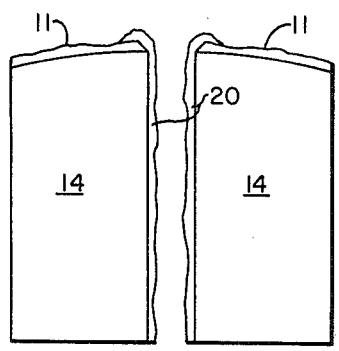
Figure 4D:
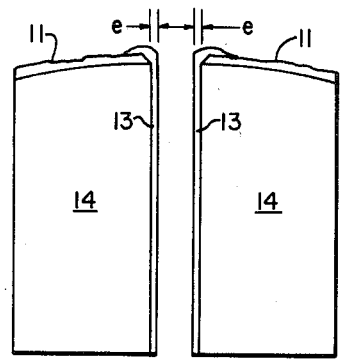
Figure 4E:
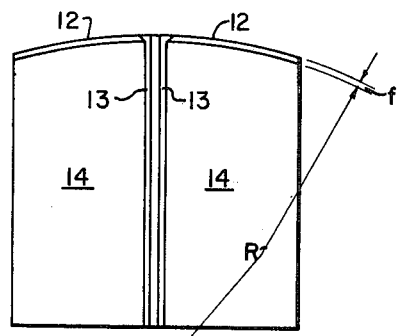

The first step is shown in FIG. 4A wherein the crown of the metal head bar 14 is coated with molybdenum 11. The spring steel shim 15, which is about 0.010" thick (b) is removed and the corners are ground down to an angle (d) of 45° as shown on FIG. 4B. The next step is to separate the head bars 14, and metal spray-coat the inner surfaces of the head bar 14 with alumina 20 as shown in FIG. 4C. (Spray coating with various substances, such as molybdenum or alumina, is well known in the prior art.) The alumina coating 20 is then ground to a thickness of about 0.015" (e) as shown on FIG. 4D. Finally the crown of head bar 14 is ground down to a thickness between 0.010" and 0.015" (f) as shown on FIG. 4E. The head bar is now ready to form the outer portion of the electrode head assembly.

Figure 1A:
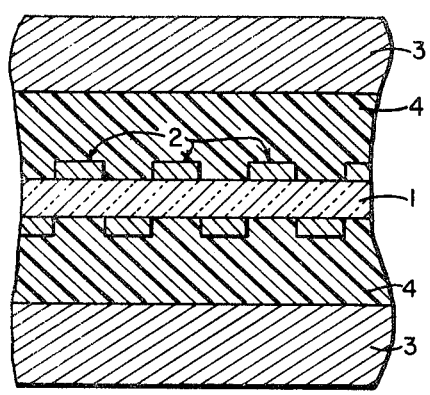
FIGS. 1A and 1B are drawings of the prior art electrographic printheads.
Figure 1B:
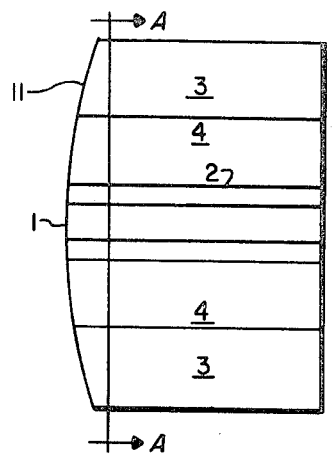
Figure 2B:
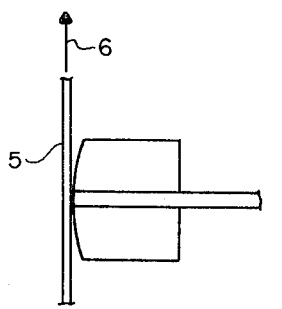
FIGS. 2A and 2B are prior art electrographic printhead illustrating a step gap caused by wear.
Figure 2A:
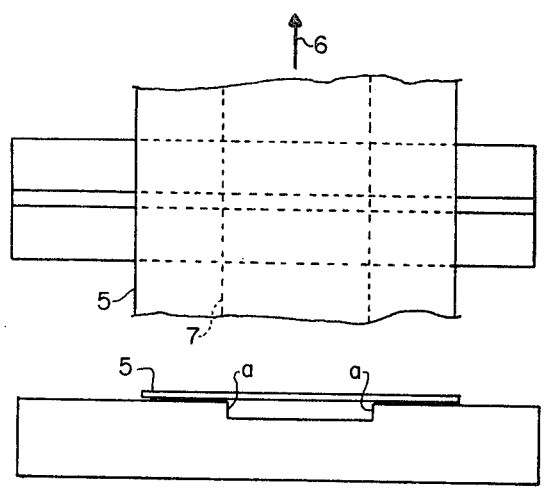
Figure 3:
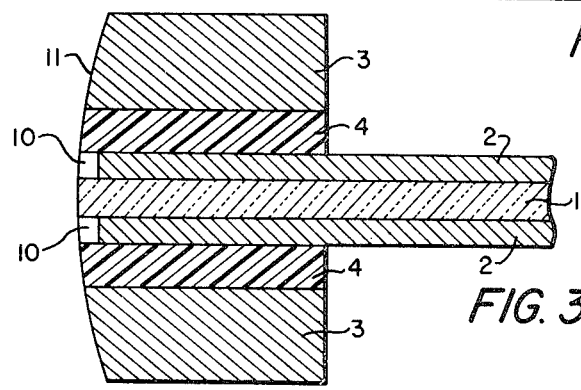
FIG. 3 is a cross section of a prior art electrographic printhead illustrating stylus erosion.
Figure 5:
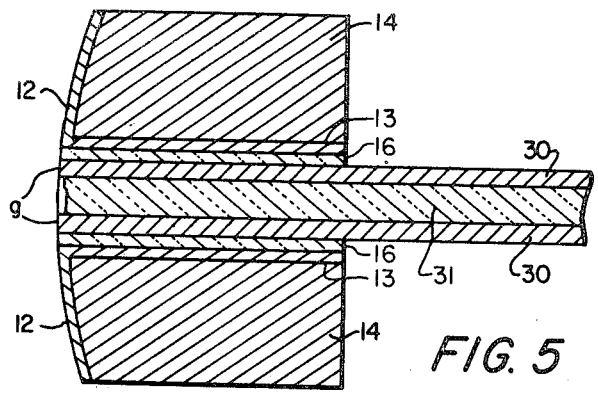
FIG. 5 is a cross section of the invention focusing on the molybdenum and alumina coatings.
Figure 6:
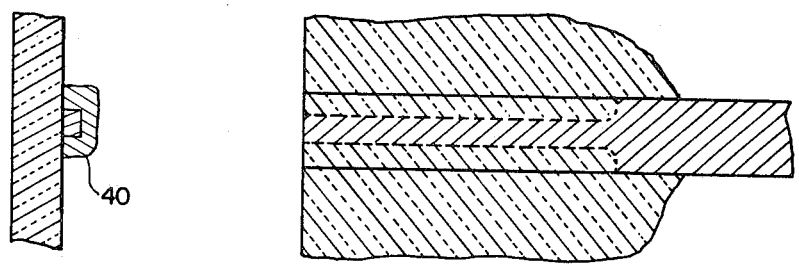
FIG. 6 shows a copper stylus plated with rhodium as utilized in the invention.
Figure 7A:
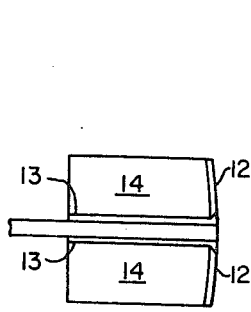
FIGS. 7A and 7B is an assembly drawing of the invention.
Figure 7B:
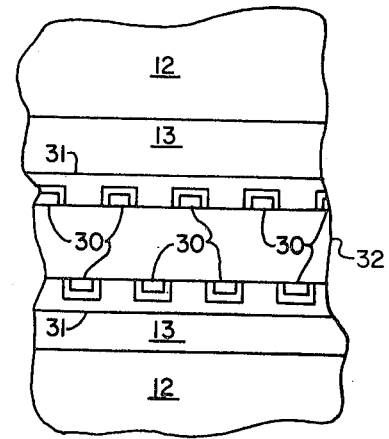

The inner portion of the electrode head assembly comprises a rhodium-plated copper stylus 30 shown in FIG. 5 which is laminated on an inner substrate 31 of polyimide glass or Teflon-glass as shown on FIG. 5. Referring to FIG. 5, it will be seen that the epoxy 4 and head bar 3 of prior art FIGS. 1-3 has been replaced by improved epoxy 16 and the molybdenum, alumina-coated head bar 14. The molybdenum provides desirable thermal and electrical properties as well as lubricity which reduces head bar wear as the paper slides by. The epoxy and alumina provide the insulating and thermal properties. All this minimizes wear. However, there is still the soft copper stylus exposed at position (g) as shown on FIG. 5. This would cause wear of the copper stylus if it were not protected with rhodium 40 as shown on FIG. 6. Finally, the complete electrode head assembly is shown on side view 7A and plan view 7B. A coating of molybdenum 12 is on the crown of head bars 14. Alumina 13 coats the inside face of head bar 14. Rhodium-plated copper styli 30 are laminated to the polyimide-glass substrate 31 and imbedded in epoxy 31.

The alumina-molybdenum coated steel head bars subassembly is typically bonded to the polyimide glass-styli subassembly utilizing an epoxy of substantially the following composition:

| Resin: | Cycloaliphatic epoxide, from Union Carbide, ERL-4221 | 100PBWR |
|---|---|---|
| Hardener: | Hexahydrophthalic Anhydride (HHPA) | 102PBWR |
| Catalyst: | Choline base (45% in methane) | 0.2PBWR |
| Cure Initiator: | Ethylene glycol (hydroxyl) | 1.0PBWR |
| Filler: | Cabosil | 2.1PBWR |

The mixture is thoroughly blended and then placed in a vacuum to remove entrapped air bubbles. Both the head support bar bonding surfaces and the head bar area on the electrode board are coated with adhesive. Then the coating is inspected with a 6X magnifier to find any air bubbles. The head support bars are placed on each side of the polyimide electrode board assembly and clamped together. Curing of the epoxy is performed at a temperature of 310°±10° F. at a 50 psi pressure for four hours.

When the epoxy in the printhead assembly has finished curing, the printing surface is ground to the required depth and contour with the printing styli exposed for printing. A final microscopic examination of the printing surface is performed to ensure that no defects or voids that could affect printing exists in the epoxy adhesive layer.

From the foregoing description it should be realized that the present invention which includes the dragging of the electrode across media to provide electrographic printing has many advantages over prior art processes and devices as previously discussed. While the present invention has been described in connection with a particular embodiment thereof, it is to be understood that modifications of this embodiment, as well as other embodiments utilizing the underlying principle of the invention, are included within the spirit and scope of the invention, which is to be limited only the accompanying claims.

What is claimed is:

1. A method of making an electrode head assembly for use in electrographic printing comprising the steps of:
   (a) etching a plurality of longitudinal copper styli on a substrate of polyimide glass with only the ends exposed thus forming a first assembly;
   (b) assembling first and second solid metal head bars, each head bar having six congruent rectangular surfaces so that a first face surface of the first head bar is parallel to a second face surface of the second head bar and separated by a thin shim, said first and second face surfaces being longitudinal to said electrode head assembly and comprise the interface surfaces of said electrode head assembly, said interface surfaces also being at right angles to third and fourth face surfaces of said first and second solid metal bars;
   (c) spray coating said third and fourth face surfaces with a thin coating of molybdenum making an intimate bond therewith;
   (d) removing said thin shim and separating said first and second face surfaces;
   (e) spray coating said first and second face surfaces with a thin coating of alumina making an intimate bond therewith;
   (f) grinding said molybdenum and alumina faces;
   (g) assembling said electrode head assembly by sandwiching said first assembly between said first and second face surfaces; and
   (h) intimately bonding said first and second face surfaces to said first assembly.

2. The method as recited in claim 1 wherein said shim is substantially 0.010 inches thick.

3. The method as recited in claim 1 including the step of making a 45° bevel at the juncture of said first and second faces with said third and fourth faces.

4. The method as recited in claim 1 wherein the thickness of said molybdenum coat is 0.010 to 0.015 inches.

5. The method as recited in claim 1 wherein titania is utilized instead of alumina.

6. The method as recited in claim 4 wherein the thickness of said alumina coat is substantially 0.015 inches.

7. The method as recited in claim 4 utilizing epoxy comprising resin, hardener, catalyst, cure initiator and filler to bond said first and second face surfaces to said first assembly.

* * * * *